(12) United States Patent
Couet (10) Patent No.: US 7,577,401 B2
(45) Date of Patent: Aug. 18, 2009

(54) METHOD AND SYSTEM FOR DISTRIBUTION IN A SATELLITE RECEPTION INSTALLATION

(75) Inventor: Jean-Yves Couet, Saint Martin le Vinoux (FR)

(73) Assignee: STMicroelectronics SA, Montrouge (FR)

( * ) Notice: Subject to any disclaimer, the term of this patent is extended or adjusted under 35 U.S.C. 154(b) by 569 days.

(21) Appl. No.: 11/040,169

(22) Filed: Jan. 19, 2005

(65) Prior Publication Data

US 2005/0227613 A1   Oct. 13, 2005

(30) Foreign Application Priority Data

Jan. 20, 2004   (FR)   ..... 04 00502

(51) Int. Cl.
*H04B 7/185*   (2006.01)
(52) U.S. Cl. ........ 455/12.1; 455/3.01; 455/3.02; 455/3.06
(58) Field of Classification Search ........ 455/3.01, 455/3.06, 12.1
See application file for complete search history.

(56) References Cited

U.S. PATENT DOCUMENTS

| | | | | |
|---|---|---|---|---|
| 5,760,822 | A | | 6/1998 | Coutinho |
| 5,963,409 | A | * | 10/1999 | Chang ............... 361/56 |
| 6,826,647 | B1 | * | 11/2004 | Leyman .............. 710/317 |
| 7,130,576 | B1 | * | 10/2006 | Gurantz et al. ....... 455/3.02 |
| 2003/0236584 | A1 | * | 12/2003 | Kuwaoka ............... 700/94 |
| 2005/0086100 | A1 | * | 4/2005 | Yanagisawa et al. ..... 705/13 |

FOREIGN PATENT DOCUMENTS

DE   19749120   6/1999

(Continued)

OTHER PUBLICATIONS

International Publication No. WO 02/065780 A1.*

(Continued)

*Primary Examiner*—Matthew D Anderson
*Assistant Examiner*—Adel Youssef
(74) *Attorney, Agent, or Firm*—Lisa K. Jorgenson; Jon A. Gibbons; Fleit Gibbons Gutman Bongini & Bianco P.L.

(57) ABSTRACT

A system and method for signal distribution within a satellite reception installation. The system includes a receiver for receiving a satellite signal, and for selecting an external signal from among several external signals included in the satellite signal. The signal selected is pre-processed. A plurality of processing units are each linked to the receiver via a respective associated wire link and operating in reception in the UHF frequency band called Satellite Intermediate Band (SIB) and a signal distribution subsystem with a switching matrix for switching the pre-processed selected external signal to at least one of the processing units via the associated wire link. The signal distribution subsystem further includes at least one connection internal to the satellite reception installation, adapted for the transmission of an internal signal which is transmitted in the SIB by a first processing unit selected from the plurality of processing units to at least one second processing unit selected from the plurality of processing units, via the signal distribution subsystem.

22 Claims, 7 Drawing Sheets

FOREIGN PATENT DOCUMENTS

| | | |
|---|---|---|
| DE | 20008239 | 7/2001 |
| DE | 10155481 | 5/2003 |
| EP | 2000232462 | 8/2000 |
| FR | 2 835 368 | 8/2003 |
| WO | WO 01/17143 | 3/2001 |
| WO | WO 02/065780 | 8/2002 |
| WO | WO 2004/038965 | 5/2004 |

OTHER PUBLICATIONS

European Telecommunications Satellite Organization: Digital Satellite Equipment Control (DiSEqC), Bus Functional Specification, Version 4.0, Mar. 22, 1996, XP002149629.

French Preliminary Search Report dated Jun. 8, 2004 for French Application No. 0400502.

* cited by examiner

METHOD AND SYSTEM FOR DISTRIBUTION IN A SATELLITE RECEPTION INSTALLATION

CROSS-REFERENCE TO RELATED APPLICATIONS

This application is based upon and claims priority from prior French Patent Application No. 04100502, filed on Jan. 20, 2004 the entire disclosure of which is herein incorporated by reference.

FIELD OF THE INVENTION

The present invention generally relates to satellite reception installations comprising several processing units, also referred to as boxes, and is more specifically related to the exchange of data between these processing units.

BACKGROUND OF THE INVENTION

The field of satellite reception installations has seen an upsurge over the last few years. The services offered by such installations, in particular satellite television, have greatly contributed to this considerable development. In parallel with this, the market for video appliances of all kinds (TV, digital video recorder, and more.) has expanded significantly. Today, many households have a satellite reception installation comprising several processing units, or box, distributed within various rooms of the family home. In a typical installation all the processing units are connected to a single reception head, also referred to as an LNB (standing for "Low Noise Block downconverter") or more simply designated by the term satellite receiver in the present description.

Figure 1A:
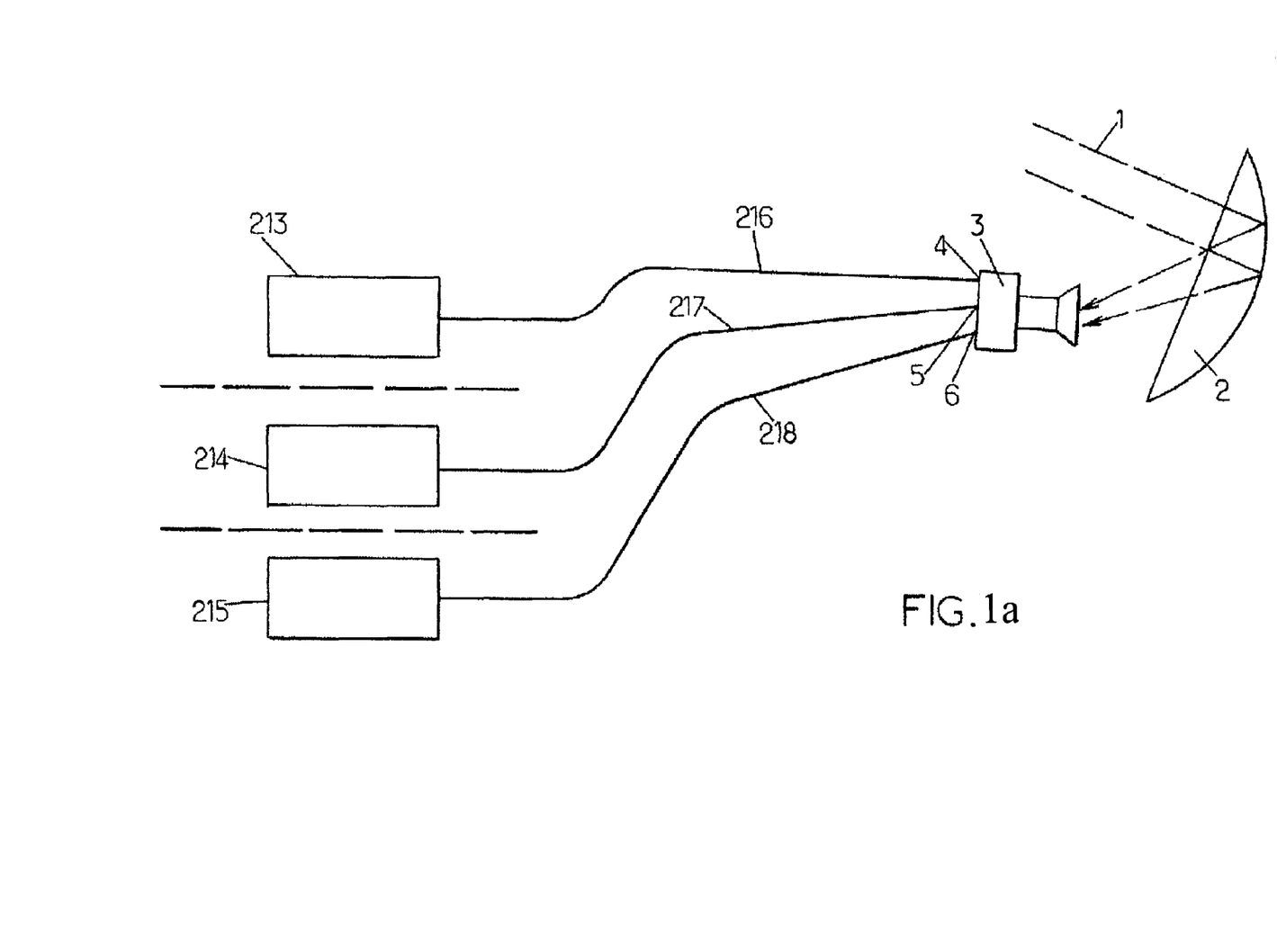
FIG. 1A, already commented above, illustrates a conventional architecture of a satellite reception installation of the prior art.

FIG. 1A illustrates the configuration of an installation of a residential installation comprising three processing units 213, 214, and 215. An initial satellite signal 1 is reflected and focused by a parabolic antenna 2 so as to be redirected towards a receiver 3. Output ports 4, 5 and 6 of the receiver are connected respectively to the processing units 213, 214, and 215 via coaxial cables 216, 217, and 218. The receiver 3 first carries out a selection of a signal from amongst several signals included in the initial signal, before carrying out a preprocessing on each signal selected. The preprocessed signals are then switched by a switching matrix so as to be transmitted via the coaxial cables 216, 217, and 218 to the respective processing units 213, 214, and 215. The term "signal" refers to an RF signal in the present description.

The basic principles of satellite reception, based on the functions of a conventional receiver, are described in greater detail hereinbelow.

One of the first functions of the receiver 3 is to collect the satellite signals. A satellite signal is generally broadcast according to two crossed polarizations, the two polarizations possibly being linear, that is to say horizontal and vertical, or else circular, that is to say left and right. Accordingly, a conventional receiver generally comprises two antennas. A first antenna for collecting the signals of horizontal, i.e., left polarization and a second antenna for collecting the signals of vertical, i.e., right polarization. The receiver carries out a first selection from among a first signal of horizontal polarization and a second signal of vertical polarization. Thereafter, the receiver amplifies the signal thus selected with the smallest possible noise factor.

Another important function of such a receiver is to lower the frequency band of the signal selected into a frequency band, commonly referred to as the transmission frequency band or else the Satellite Intermediate Band or SIB, compatible with the operation of the processing units. Typically, the satellite signal 1 is received by the receiver 3 in an initial frequency band lying between 10.7 GHz and 12.75 GHz. This frequency band is too high to be transmitted directly to a processing unit. It is therefore lowered by the receiver 3 in the SIB compatible with the capabilities of the processing units. Conventionally, the SIB lies between around 950 MHz and around 2150 MHz. The SIB may also lie between around 950 MHz and around 1450 MHz. A satellite signal with linear polarization and an SIB lying between 950 MHz and 2150 MHz are taken by way of example in the subsequent description.

The initial frequency band being wider than the SIB, the initial frequency band is divided into two parts: a low initial frequency band and a high initial frequency band. Thus, the receiver carries out a second selection from among a modulated signal in the low frequency band and a modulated signal in the high band. Upon completion of this second selection, the receiver selects one from among the four signals emanating from the initial satellite signal. The spectrum of these four signals is represented diagrammatically in FIG. 1B, whereby convention, spectra of vertical or horizontal polarization are represented respectively below or above the frequency axis. One thus distinguishes between the modulated vertically polarized signal in the low initial frequency band VeBa, the modulated vertically polarized signal in the high initial frequency band VeHa, the modulated horizontally polarized signal in the low initial frequency band HoBa and the modulated horizontally polarized signal in the high initial frequency band HoHa.

The receiver carries out a preprocessing of the signal selected before switching it via a switching matrix. This preprocessing consists in mixing the frequency of the signal selected previously with a predetermined mixing frequency so as to obtain a preprocessed signal in the SIB. The predetermined mixing frequency generally used for processing the low initial frequency band is conventionally 9.75 GHz and that for processing the high initial frequency band is conventionally 10.6 GHz.

Figure 1B:
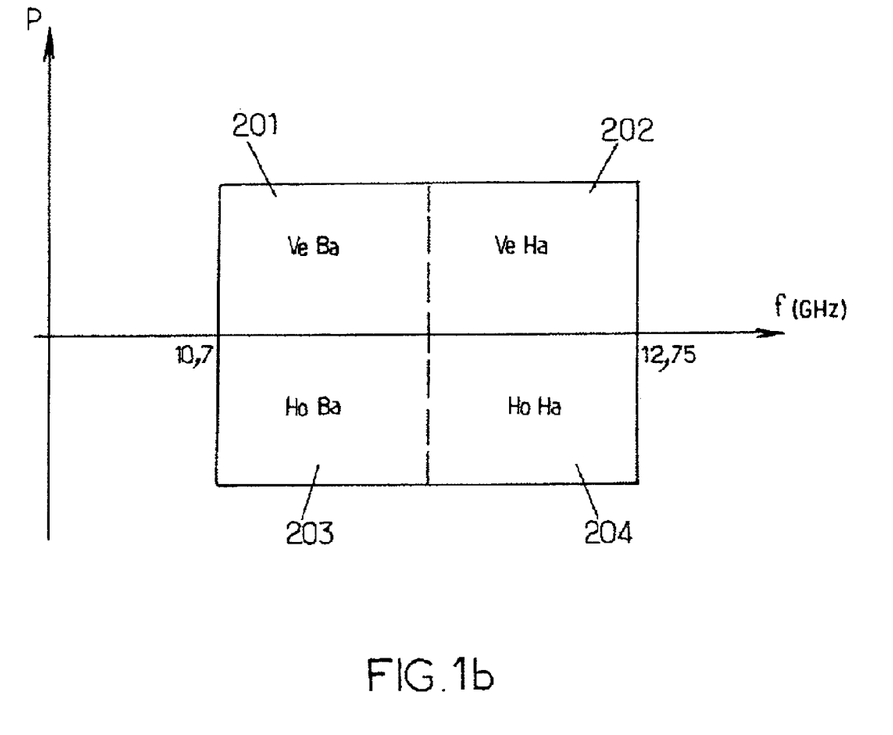
FIG. 1B diagrammatically illustrates the spectrum of the signals emanating from a satellite external signal.

The receiver 3 therefore provides four signals, emanating respectively from preprocessed signals VeBa, VeHa, HoBa and HoHa, which are selectively transposed into the SIB. FIG. 1B illustrates the four signals VeBa, VeHa, HoBa and HoHa referenced 201, 202, 203 and 204 respectively and which are included in the satellite external initial signal.

The coaxial cables referenced 216, 217 and 218 each transport at most one of the preprocessed signals described above, the same signal possibly of course being transported on several cables. Within the receiver, a microcontroller manages a switching matrix on the basis of commands received from the processing units so as to transmit a determined preprocessed signal to at least one respective processing unit. In general, such a switching matrix is integrated into the receiver. However, in certain installations the switching matrix forms part of another box connected to the receiver.

Each processing unit is in charge of processing one or more "useful" signals extracted from the preprocessed signal transmitted by the coaxial cable linking it to the receiver 3. Typically, the expression "useful signal" designates a signal corresponding to a given satellite channel.

In a conventional architecture of a satellite reception installation, the processing units are independent of one another and do not exchange information with one another.

Now, the need is apparent for the processing units of one and the same installation to be able to exchange data in the SIB. Specifically, these processing units may offer various functions such as a function for recording digital data of video or film type on a mass storage medium, a function for reading data thus recorded, a function allowing them to be connected to the telephone network, a function for managing decoding entitlements, and more.

There are several known solutions to share and exchange data in the SIB among processing units in a given installation. One solution is to install a new wire link and hence a new coaxial cable. This solution although useful, must be balanced by the major drawbacks of the cost of installation, the cost of maintenance and the unattractive sight of the cabling.

Another solution is to transmit a signal from a processing unit to another processing unit by way of operations carried out by the microcontroller. Specifically, the microcontroller can receive the signal from a processing unit, store it so as to repeat it in order to transmit it via the cable corresponding to the destination processing unit. Only signals of low throughput, such as the messages of a protocol such as the protocol known by the trade mark DiSEqC, may be exchanged using this solution between the processing units, generally at the frequency of 22 KHz. This solution although useful, does not provide a throughput that is high enough to transmit a quantity of information that is required by applications such as the transmission of audio and video signals since the signal dispatched by one processing unit to another processing unit is first received, then decoded and finally stored by the microcontroller of the receiver before being repeated so as to be transmitted to the other processing unit.

Another solution is based on wireless transmission by integrating a transceiver into each processing unit. However, this solution has the drawback of the financial cost of the equipment. Moreover, the operator providing a satellite-based service wishes to limit the access to this service solely to the subscribers to this service, thereby requiring particularly expensive measures for precluding access to the service by any neighbors of the subscribers who are not themselves subscribers. Providing this security to restrict access is very expensive in the field of wireless transmission.

Accordingly, a need exists to overcome the drawbacks and problems of the prior art and to provide an inexpensive and easy way to implement a system, included in a satellite reception installation which would allow the processing units of one and the same installation to share functions.

SUMMARY OF THE INVENTION

Briefly, in accordance with the present invention provides an inexpensive and easy to implement system solution which allows processing units of one and the same installation to share functions solution.

A first aspect of the invention accordingly proposes a method of signal distribution within a satellite reception installation which comprises:

a receiver for receiving a satellite signal, for selecting an external signal from among several external signals included in the satellite signal and for preprocessing the selected external signal, a plurality of processing units each linked to the receiver via notably a respective associated wire link and operating in reception in the UHF frequency band called the Satellite Intermediate Band or SIB;

a signal distribution subsystem with a switching matrix for switching the preprocessed selected external signal to at least one of the processing units via the associated wire link, characterized in that there is provided at least one connection internal to the installation, adapted for the transmission of an internal signal which is transmitted in the SIB by a first determined processing unit to at least one second determined processing unit via the signal distribution subsystem.

A second aspect of the present invention proposes a distribution subsystem for implementing the method described in the first aspect.

A third aspect of the invention proposes a system for implementing the method described in the first aspect.

A fourth aspect of the invention proposes a processing unit adapted to be used in a system for signal distribution according to the third aspect within a satellite reception installation comprising a receiver for receiving satellite signal and a signal distribution subsystem. The processing unit is linked to the distribution subsystem via a wire link and comprises means for processing a received signal, in the UHF frequency band called Satellite Intermediate Band or SIB, via the wire link.

In one embodiment, the processing unit further comprises a signal modulation unit adapted for modulating a signal in the SIB, and for transmitting the signal thus modulated towards the distribution subsystem via the wire link.

The processing unit can comprise a signal modulation unit adapted for modulating a signal in a frequency band which is distinct from and substantially adjacent to the SIB and for transmitting the signal thus modulated towards the distribution subsystem via the wire link.

The processing unit can be a set top box.

Other aspects, aims and advantages of the invention will become apparent on reading the description of one of its embodiments, given hereinbelow with reference to the appended drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention will be apparent from the following detailed description taken in conjunction with the accompanying drawings in which:

DESCRIPTION OF THE PREFERRED EMBODIMENTS

It should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

In the various figures, the same references designate identical or similar elements. In the present description, the term "external signal" refers to a signal received from outside the satellite reception installation, that is to say a satellite signal or a signal emanating from a satellite signal, the term "internal signal" refers to a signal produced and transmitted inside the satellite reception installation and the term "internal connection" refers to a connection making it possible for an internal signal emitted by a processing unit in a frequency lying within the SIB to be transmitted to one or more processing units.

Figure 2:
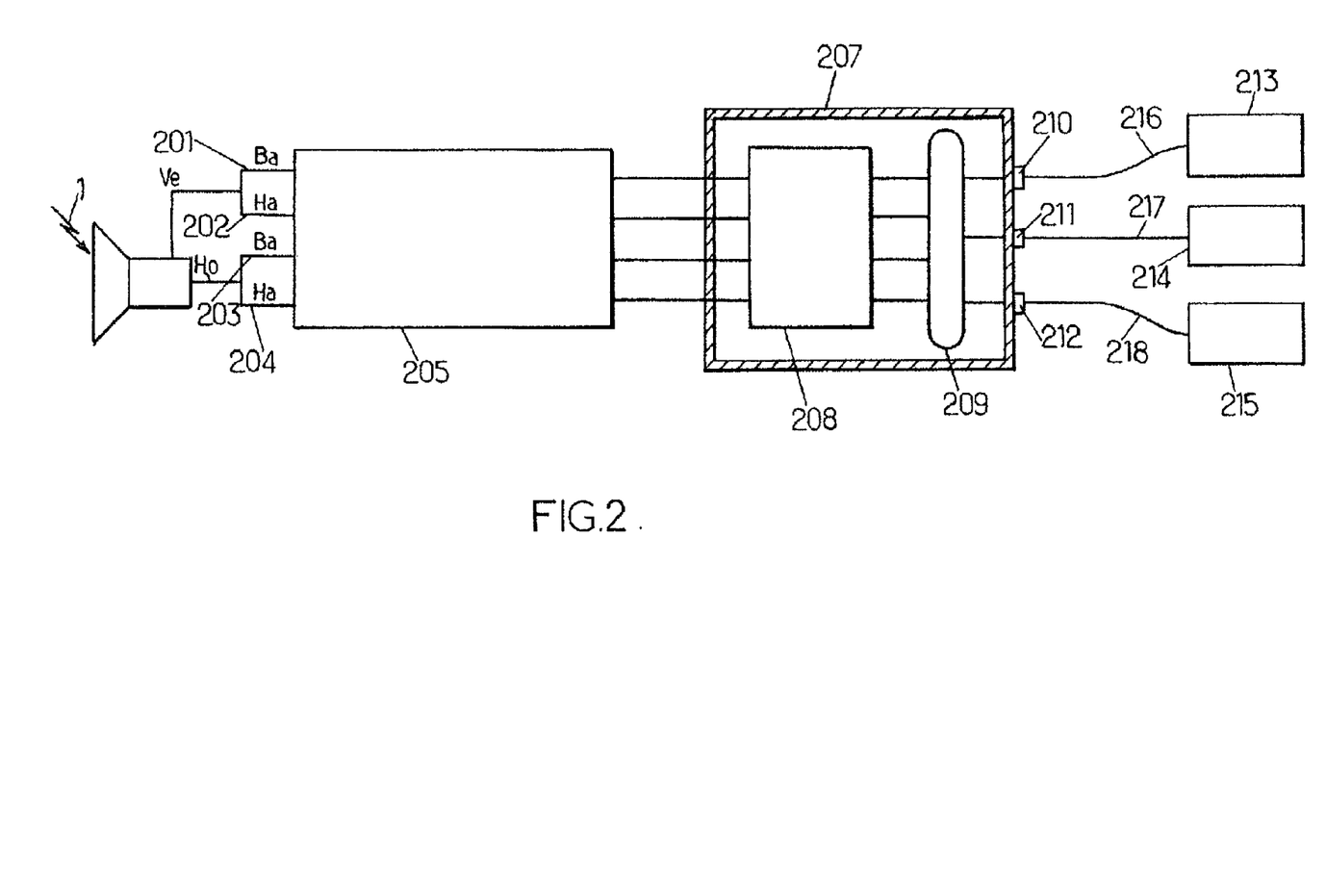
FIG. 2 diagrammatically illustrates the functional blocks of a satellite reception installation according to an embodiment of the invention.

Reference is made to FIG. 2 which diagrammatically shows the functional blocks of an installation according to an embodiment of the invention. A receiver comprises a preprocessing functional block 205 which receives as input the external signals VeBa, VeHa, HoBa and HoHa respectively referenced 201, 202, 203 and 204 emanating from the satellite external initial signal 1. The signal thus received is preprocessed by the preprocessing functional block 205 before being transmitted to a signal distribution subsystem 207. The subsystem 207 may be included within the receiver or simply be connected to it. It receives as input a preprocessed signal. It comprises a switching matrix 208 and connection means 209 for coupling outputs of the switching matrix to the ports referenced 210, 211 and 212 of the subsystem 207. The subsystem 207 is thus adapted to be able to directly connect at least two ports together.

In the following figures, the dashed arrows represent the transmission of a control signal emitted by the processing unit 213 to the processing unit 214. The continuous arrows represent the transmission of a data signal emitted by the processing unit 214.

Figure 3:
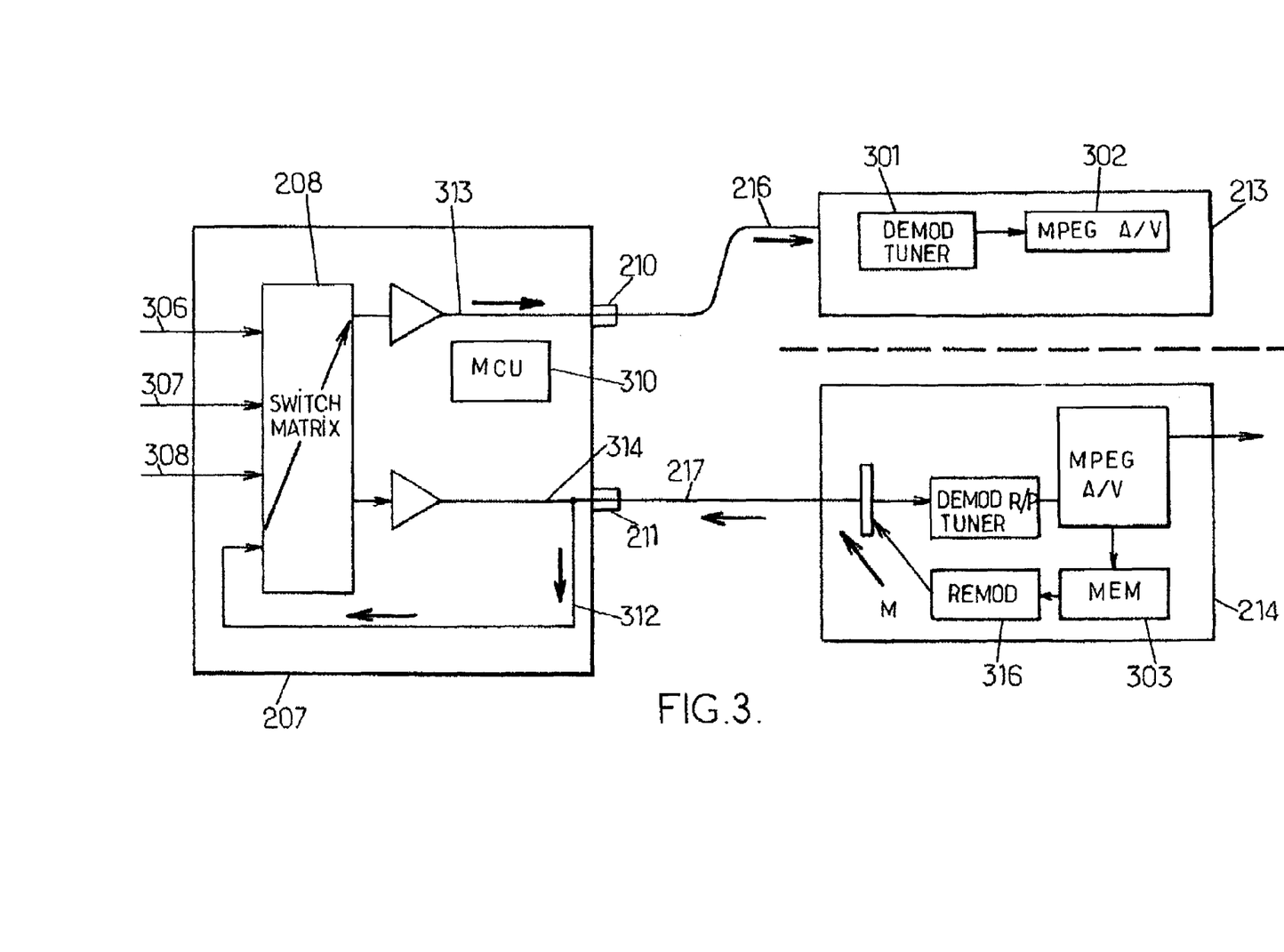
FIG. 3 is a diagram of a part of a satellite reception installation according to an embodiment of the invention.

FIG. 3 represents a part of a satellite reception installation comprising two processing units 213 and 214, according to an embodiment of the invention. This number of processing units is taken by way of example to simplify the description. The invention can of course be applied to a satellite reception installation comprising a larger number of processing units. FIG. 3 illustrates a signal distribution subsystem 207 exhibiting two ports 210 and 211, each of them being connected by two coaxial cables 216 and 217 respectively to the two processing units 213 and 214 respectively. The preprocessed signals 306, 307 and 308 are received by the subsystem 207. The distribution subsystem 207 exhibits as many ports as there are processing units to be connected. In the example illustrated in FIG. 3, the processing unit 213 is a device which comprises a demodulator/tuner 301 and an MPEG protocol decoder 302. This type of device ("Set-Top-Box") generally precedes a television screen. The processing unit 214 is for example a digital video recorder which conventionally comprises a demodulator/tuner, an MPEG protocol decoder and a mass storage memory 303, such as a hard disk, a CD-ROM or a DVD-ROM. One speaks of a DVR (standing for "Digital Video Recorder") to designate such a device. It furthermore comprises a remodulator bearing the reference 316.

Moreover, the signal distribution subsystem 207 comprises a microcontroller 310, a switching matrix 208 whose outputs are referenced 313 and 314. Of course, for such a subsystem included within a receiver, the microcontroller can be that of the receiver. When the processing unit 214 wishes to receive one of the preprocessed signals so as to store the data that it contains, it sends the subsystem 207 a corresponding control message using for example the aforesaid DiSEqC protocol. The microcontroller 310 processes this message, instructing the switching matrix 208 to transmit the preprocessed signal requested to the corresponding processing unit. The processing unit 214 stores the data, which may correspond for example to a film, in the memory 303. Then the processing unit 214 instructs the stoppage of reception.

When, for example, the processing unit 213 wishes to read the film previously stored in the memory 303 of the processing unit 214, it sends the processing unit 214 a request message for sending of data via the DiSEqC protocol. This request message is transmitted by the cable 216 to the signal distribution subsystem 207. The microcontroller 310 receives this request message, stores it and repeats it on the cable 217 so as to transmit it to the processing unit 214 to which the message is destined. It should be noted that the signals corresponding to the control protocol messages have generally a frequency of about 22 KHz. Therefore, the exchange of control messages can be carried out via the aforesaid processing of the microcontroller. On receipt of the request message, the subsystem 214 recovers the data concerned by reading from the memory 303 and transmits them in a signal remodulated by the remodulator 316 in a frequency lying within the SIB. The remodulated signal is transmitted to the port 211 of the distribution subsystem 207 via the cable 217. In the signal distribution subsystem 207, a feedback connection 312 looped from the port 211 to an input of the switching matrix 208 allows the remodulated signal to be transmitted as input to the matrix. Thus it may be switched to the output 313 of the matrix so as to be transmitted to the processing unit 213 via the coaxial cable 216. The port 211 of the signal distribution subsystem 207 linked to the processing subsystem 214 is called an "advanced port". An advanced port such as this allows transmission of an external signal received from the satellite like all the other ports and also transmission of the internal signal of frequency lying in the SIB to one or more other processing units by the processing unit connected to the advanced port. An advanced port therefore becomes an input/output port. Such a connection allows the transmission of a signal of frequency lying in the SIB and carrying a high throughput equivalent to or greater than the throughput allowing the transmission of video data for example.

In the above-described embodiment of the invention, while data from the memory 303 of the unit 214 are being transmitted internally, part of the SIB of the two coaxial cables is used. Now, the transmission of a preprocessed satellite signal on a coaxial cable conventionally occupies the whole of the SIB. Therefore, neither the processing unit 214 nor the processing unit 213 can receive a satellite signal from outside while the unit 214 is "reading" the memory, that is to say in the example of FIG. 3, while the film is being read.

Figure 4:
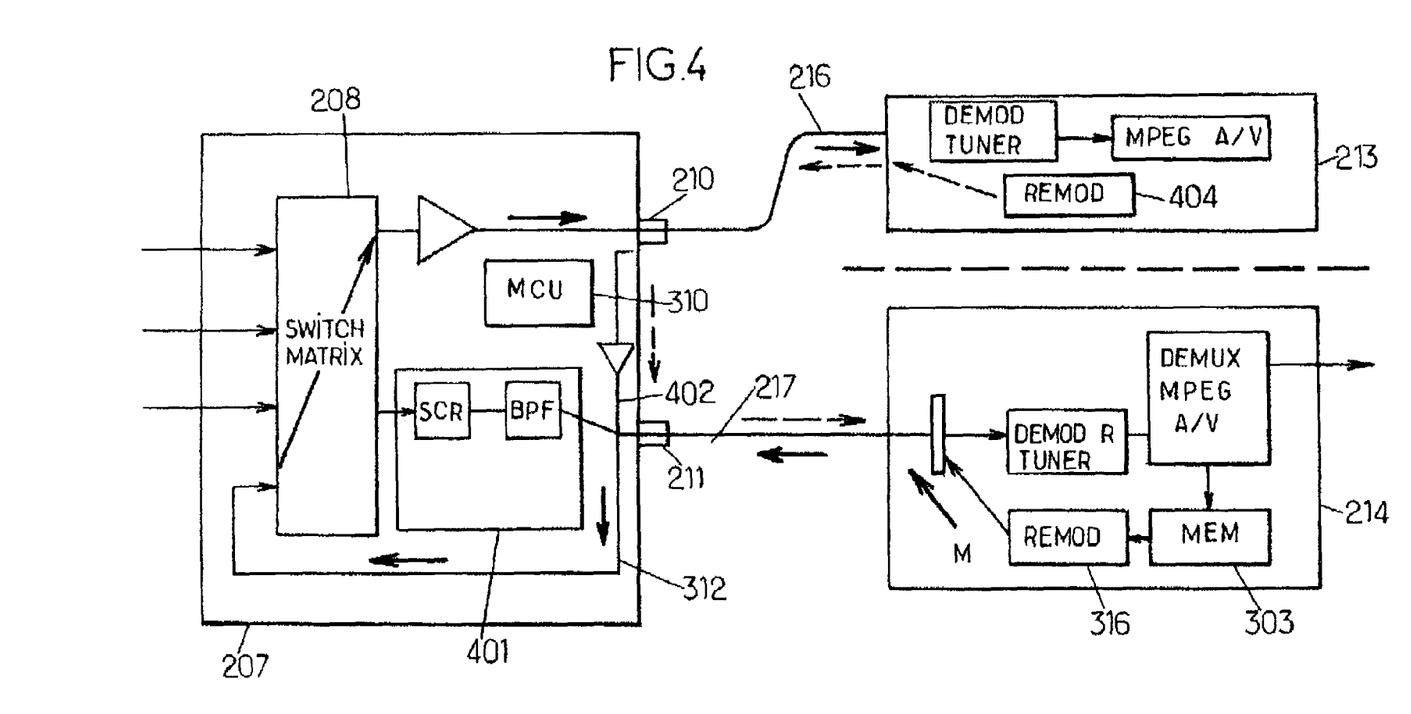
FIG. 4 is a diagram of a part of a satellite installation according to another embodiment of the invention comprising a Satellite Channel Router (SCR)

In a preferred embodiment of the invention, illustrated by the diagram in FIG. 4, the signal distribution subsystem 207 and more precisely the advanced port of this subsystem comprises means for transmitting a preprocessed satellite external signal in a part only of the SIB. The SIB is consequently separated into a first frequency sub-band and a second frequency sub-band. The first frequency sub-band is used for the reception of the preprocessed signal. The second frequency sub-band may thus be used for the transmission of a remodulated internal signal from one processing unit to another processing unit. This functionality is described in detail in patent application FR-A-2835368, which is hereby incorporated by reference in its entirety.

Specifically, patent FR2835368 describes a receiver advantageously provided with a shift and filtering function which makes it possible to extract useful signals from various preprocessed signals and to combine them so as to transmit them simultaneously via one and the same coaxial cable. Thus, a receiver furnished with such a functionality is capable of providing a processing unit simultaneously requesting useful external signals emanating from various preprocessed signals, stated otherwise emanating from differently polarized signals and/or from signals of initial frequency band Ba or Ha, through a single coaxial cable. This functionality is based on a system comprising a satellite channel router (or SCR) and a bandpass filter (BPF). A satellite channel router comprises a frequency mixer for shifting the frequency band of the preprocessed signal as a function of a predetermined mixing frequency. The signal, preprocessed, switched and shifted by the mixing frequency, then passes into the bandpass filter able to extract a signal corresponding to a useful signal requested by the requesting processing unit, stated otherwise corresponding to a given satellite channel.

FIG. 4 represents a part of a satellite reception installation comprising a signal distribution subsystem according to a preferred embodiment. The signal distribution subsystem 207 here comprises, as is described in respect of the diagram of FIG. 3, a feedback connection 312 looped to an input of the matrix 208. The distribution subsystem 207 furthermore comprises on the advanced port a shift and filtering function 401 executed by an SCR and a bandpass filter. In this way, the satellite signal, preprocessed and switched is shifted and filtered so as to be transmitted in the first frequency sub-band. Consequently, the processing unit 213 can instruct the transmission of data to the processing unit 214 simultaneously, in the second frequency sub-band. Transmission could be requested by the processing unit 213 in the same manner as described previously in FIG. 3, via a processing by the microcontroller. In an embodiment of the invention, the processing unit 213 comprises a remodulator referenced 404. The control signal is remodulated by the remodulator 404 in a distinct frequency band adjacent to the SIB before being sent via the cable 216 to the subsystem 207. The subsystem 207 receives the control signal on the port 201 and transmits the signal to the port 211 via a connection referenced 402, before the transmission on the cable 217 to the processing unit 214. The connection 402 comprises a directional coupler and connects the port referenced 210 to the port referenced 211. This connection allows the transmission of a high throughput carrier UHF signal. In general the processing units are capable of processing a signal lying in the SIB. Some of them can process signals of frequency lying between 900 and 950 MHz. The control signal remodulated by the unit 213 is preferably transmitted in a frequency band adjacent to the SIB lying between 900 and 950 MHz. Such control signal transmission by such a connection 402 allows very fast transmission of commands between processing units. Transmission of the signal sent by the unit 214 to the unit 213 is carried out in the same way as described previously in the description of FIG. 3.

Figure 5:
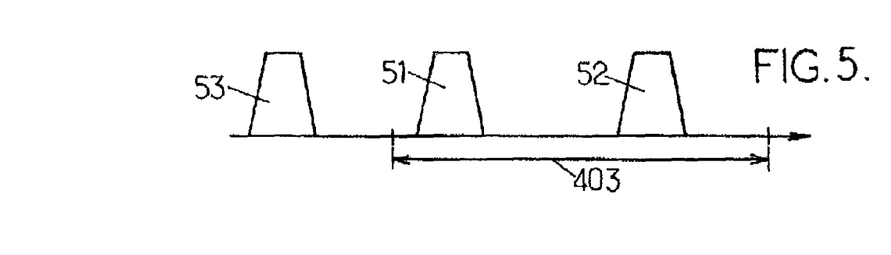
FIG. 5 illustrates a use of the SIB of a coaxial cable according to an embodiment of the invention.

FIG. 5 illustrates the use of the SIB referenced 403 in the exemplary embodiment of FIG. 4, when the processing unit 214 receives an external signal 51 and simultaneously transmits an internal signal 52 to the processing unit 213. The signal referenced 51 corresponds to the preprocessed signal emanating from a satellite external signal and the signal referenced 52 corresponds to the internal signal. These two signals occupy distinct frequency sub-bands lying in the previously defined SIB. Hence, they can be transmitted simultaneously. Moreover, the control signal emitted by the unit 213 and referenced 53 is represented outside the SIB but in an adjacent frequency band preferably lying between 900 and 950 MHz.

Figure 6:
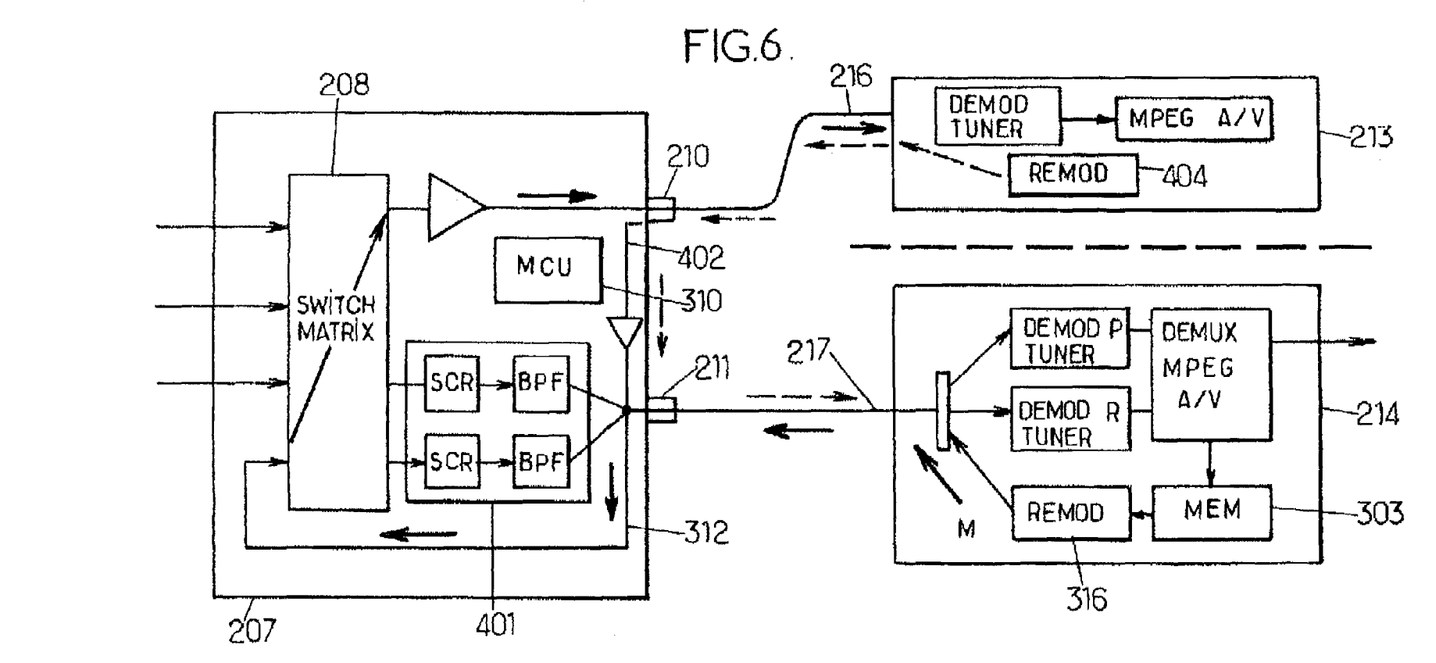
FIG. 6 is a diagram of a part of a satellite reception installation according to an embodiment of the invention comprising two Satellite Channel Routers (SCR)

FIG. 6 illustrates a part of a satellite reception installation comprising two processing units 213 and 214, and in which the port 211 of the distribution subsystem 207 allows the processing unit 214 to receive an external signal, emanating from a satellite signal, for immediate reading (for display on a television screen linked to this unit for example), to record another external signal in the memory, and to transmit to the processing unit 213 at a frequency lying in the SIB an internal signal on the basis of data recovered from the memory. The signal read and the signal recorded may emanate from two distinct preprocessed signals emanating from a satellite initial signal. Specifically, the advanced port 211 of the distribution subsystem 207 is here correlated with two outputs of the matrix and hence with two preprocessed signals that may be different, each of these two signals being shifted and then filtered by the shift and filtering function 401 before being transmitted on one and the same coaxial cable 217.

Figure 7:
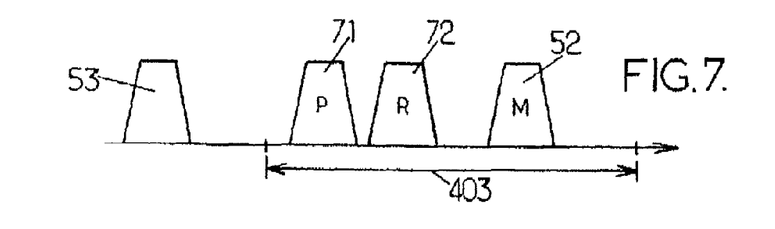
FIG. 7 illustrates a use of the SIB of a coaxial cable according to an embodiment of the invention.

FIG. 7 illustrates the use of the SIB referenced 403 of the coaxial cable in the example given above. The signal referenced 71 (or P for Play) corresponds to the external signal for immediate reading, the signal referenced 72 (or R for Record) corresponds to the external signal recorded and the signal referenced 52 corresponds to the internal signal transmitted by the processing unit 214 to the processing unit 213. These signals are apportioned frequency-wise inside the previously defined SIB. The signals 71 and 72 emanating from an external initial signal are transmitted in a first frequency sub-band and the internal signal 52 is transmitted in a second frequency sub-band, the two frequency sub-bands being distinct. The control signal 53 is also represented as in FIG. 5.

Of course, various embodiments of the present invention may be practised readily in respect of a satellite reception installation comprising a larger number of processing units and with a signal distribution subsystem exhibiting a number of ports corresponding to the number of processing units. Moreover, it should be noted that a distribution subsystem according to an embodiment of the invention comprising several advanced ports is also possible. In a preferred embodiment of the invention, the ports of such a signal distribution subsystem furthermore incorporate a shift and filtering function 401.

Figures 8, 9:
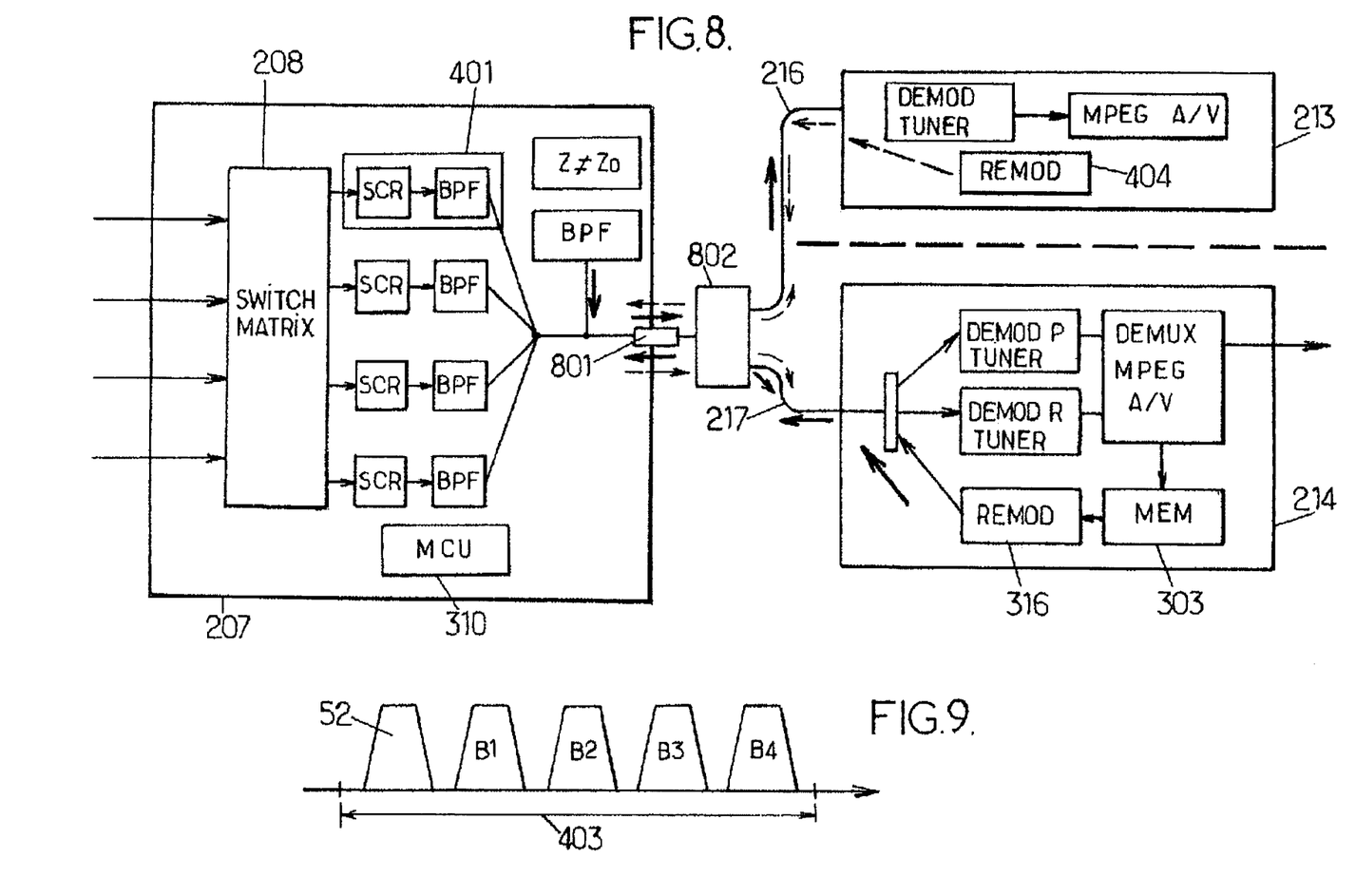
FIG. 8 is a diagram of a part of a satellite reception installation according to another embodiment of the invention comprising a reflexive impedance.
FIG. 9 illustrates a use of the SIB of a coaxial cable according to an embodiment of the invention.

FIG. 8 illustrates a part of a satellite reception installation according to an embodiment of the invention in which the connection means 209 differ from the embodiments described previously. Here, all the outputs of the switching matrix 208 are provided with a shift and filtering function 401. Consequently, all the preprocessed and switched signals are shifted and filtered so as to be transmitted in the first frequency sub-band. Thus, it is possible to couple all the outputs of the matrix 208 to a single port 801 of the distribution subsystem 207. The processing unit 214, on receipt of a data request signal, returns data read from the memory 303 and remodulates these data in the form of an RF signal so as to transmit the data via the coaxial cable 217 in the second determined frequency sub-band. The signal distribution subsystem 207 comprises an impedance which causes the reflection of the internal signal thus received from the processing subsystem 214 and remodulated in the determined frequency second sub-band. Thus, the signal transmitted by the processing unit 214 is reflected by the signal distribution subsystem 207 and consequently it is retransmitted on all the coaxial cables as output from the signal distribution subsystem via a power divider referenced 802. An internal connection is thus established from the processing unit 214 to the processing unit 213 by reflection of the signal on a cable of determined impedance. The value of the impedance is chosen so as to offer a nonzero reflection coefficient for the second determined frequency sub-band for the remodulation of the signal emitted by the unit 214. The control signal previously sent by the unit 213 to the unit 214 could be transmitted as described in the example in FIG. 3 via a processing of the microcontroller. In a preferred embodiment of the invention, the value of the impedance is chosen so as to offer a likewise nonzero reflection coefficient for a third determined frequency sub-band lying in the SIB. Thus, the control signal is remodulated by the remodulator 404 of the unit 213 in the third frequency sub-band before being transmitted on the cable 216.

FIG. 9 illustrates the use of the SIB in such an installation. The four external signals B1, B2, B3 and B4, emanating from a satellite signal, are transmitted in the first frequency sub-band simultaneously with the transmission of the internal signal 52 from the processing unit 214 to the processing unit 213. The internal signal 52 is emitted by the processing unit 214 in the second frequency sub-band. Thus the coaxial cable linked to the port 801 can simultaneously transmit the external signals B1, B2, B3, B4 and the internal signal 52.

Many functions can share the processing units of one and the same installation according to an embodiment of the invention. In the examples described previously, the processing unit of the satellite reception installation 214 operates furthermore in a manner equivalent to a digital video recorder. Therefore, the data that the unit 214 transmits to the unit 213 are described as being read from the memory 303. Of course, the data included in the signal sent by the unit 214 to the unit 213 may come from sources other than the memory 303, such as for example from a network external to the satellite reception installation. Specifically, the unit 214 can be furnished with a module for connection to one or more external networks, such as for example the telephone network, and therefore, the data included in the internal signal sent by the unit 214 to the unit 213 may come from the exterior network or networks. More generally, the units of one and the same installation may be connected to the exterior network via the processing unit referenced here 214. Another interesting application of an embodiment of the invention is to share a function for managing decoding entitlements. Specifically, the unit 214 can comprise a function adapted for managing and storing the encryption keys corresponding for example to each unit of the installation. Thus, as soon as a processing unit is powered up, it requests the information relating to its decoding entitlements from the unit 214 which stores this information.

Irrespective of the embodiment of the invention, a processing unit can advantageously comprise functions to be shared and operate as master processing unit while the other processing unit or units operate as slave processing unit.

The present invention advantageously proposes a signal distribution subsystem within a satellite reception installation according to an embodiment of the invention that can be manufactured very easily and at a low production cost. Moreover, another advantage of the invention is the ease with which it is possible to install an subsystem according to an embodiment of the invention. Specifically, it should be noted that such an subsystem may be integrated into the receiver (or LNB) and therefore it suffices to change the LNB, as is already done when a user wishes for example to add processing units within his installation. Such an subsystem may also be integrated into a box connected to a receiver and the replacing of such a box is likewise easy to do. Consequently, the previous installation and the existing cabling, be it of coaxial cable type or else other types of wire link, may remain unchanged by virtue of the implementation of the present invention.

Moreover, given that the processing units operate in the SIB, a conventional satellite reception installation already comprises components that make it possible to manage signals sent in this frequency band. Therefore, an important advantage of an embodiment of the invention is that it can be implemented at low cost by using existing components in such installations.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method of signal distribution within a satellite reception installation, the method comprising:

receiving a satellite signal with a receiver for selecting an external signal from among several external signals included in the satellite signal and for preprocessing the external signal selected; operating in a plurality of processing units in a Satellite Intermediate Band (SIB) as part of a UHF frequency band; receiving the external signal at an input to a distribution subsystem with a switching matrix, wherein each of the processing units is linked to the distribution subsystem via a wire link, and wherein the distribution system includes an advanced input/output port, wherein an output of the advanced input/output port transmits the external signal to at least a first processing unit, selected from the plurality of processing units, and wherein an input of the advanced input/output port is adapted to receive an internal signal transmitted from the first processing unit with a frequency lying in the SIB and to provide a selectable path for the internal signal through the switching matrix of the distribution subsystem to at least a second processing unit, selected from the plurality of processing units, thereby providing the selectable path between the first processing unit and the second processing unit for distribution of the internal signal.

2. The method according to claim 1, wherein the SIB is included to be between about at least one of the following ranges 950 MHz and 1450 MHz, and 950 MHz and 2150 MHz.

3. The method according to claim 1, wherein the advanced input/output port is adapted for a transmission of data at a throughput at least equal to a throughput required for a transmission of an audio signal.

4. The method according to claim 1, wherein the internal signal is a signal containing useful data associated with at least one of audio data, video data, and control data.

5. The method according to claim 1, wherein the switching using the signal distribution subsystem includes frequency shifting and filtering along with at least one the advanced input/output port for transmitting a part of the signal, which has been selected and preprocessed, to at least the first processing unit in a first frequency sub-band of the SIB, and wherein the signal distribution subsystem simultaneously receives the internal signal sent by the first processing unit in a second frequency sub-band of the SIB, which is distinct from the first frequency sub-band.

6. The method according to claim 1, wherein the switching using the signal distribution subsystem signal distribution subsystem is included in the receiver.

7. The method according to claim 1, wherein the first processing unit includes a data memory, the method further comprising:
    sending from the second processing unit, a data read request to the first processing unit via a predetermined control protocol;
    recovering data in the data memory of the first processing unit and sending an internal signal containing the data to the second processing unit via the advanced input/output port; and
    receiving the data at the second unit and processing the data.

8. The method according to claim 1, wherein the first processing unit includes a connection module adapted for the connection to a network exterior to the satellite reception installation, the method further comprising:
    sending from the second processing unit to the first processing unit a connection command to the network exterior via a determined control protocol;
    executing the command on the first processing unit;
    exchanging data between the second processing unit and the network via the advanced input/output port and the first processing unit.

9. The method according to claim 1, wherein the advanced input/output port uses a feedback link looping the wire link associated with the first processing unit to an additional input of the switching matrix.

10. The method according to claim 1, wherein the advanced input/output port uses a reflection resulting from an impedance mismatch at the signal distribution subsystem.

11. The method according to claim 1, wherein a transmission of a command sent by the second processing unit to the first processing unit is in an Ultra High Frequency band adjacent to the SIB.

12. A signal distribution subsystem for use with a satellite reception installation including a plurality of processing units operating in a Satellite Intermediate Band (SIB) as part of a UHF frequency band, the signal distribution subsystem comprising: at least one inputs to receive an external signals; at least one advanced input/output ports for connecting to at least one of a plurality of processing units via an associated wire link, wherein an output of the advanced input/output port transmits the external signal to at least a first processing unit, selected from the plurality of processing units a switching matrix and wherein an input of the advanced input/output port is adapted to receive an internal signal transmitted from the first processing unit with a frequency lying in the SIB and to provide a selectable path for the internal signal through the switching matrix of the distribution subsystem to at least a second processing unit, selected from the plurality of processing units, thereby providing the selectable path between the first processing unit and the second processing unit for distribution of the internal signal.

13. The signal distribution subsystem according to claim 12, wherein the SIB is included to be between about at least one of the following ranges 950 MHz and 1450 MHz, and 950 MHz and 2150 MHz.

14. The signal distribution subsystem according to claim 12, wherein the advanced input/output port is adapted for a transmission of data at a throughput at least equal to a throughput required for a transmission of an audio signal.

15. The signal distribution subsystem according to claim 12, wherein the internal signal is a signal containing useful data associated with at least one of audio data, video data, and control data.

16. The signal distribution subsystem according to claim 12, furthermore comprising:
    means for transmitting from the signal distribution subsystem to the first processing unit an external signal in a first frequency sub-band of the SIB, and
    means for simultaneously receiving in a second frequency sub-band an internal signal which is sent by the first processing unit to at least the second processing unit via the advanced input/output port.

17. The signal distribution subsystem according to claim 12, wherein the advanced input/output port comprises at least one feedback wire link looped from a port of the signal distribution subsystem to an additional input of the switching matrix.

18. The signal distribution subsystem according to claim 12, wherein the advanced input/output port comprises a reflection impedance adapted to cause a reflection, to at least the second processing unit of the internal signal received from the first processing unit.

19. A processing unit for signal distribution within a satellite reception installation, the system comprising: a receiver for receiving a satellite signal and for selecting an external signal from among several external signals included in the satellite signal and for preprocessing the selected external signal; a plurality of processing units in a Satellite Intermediate Band (SIB) as part of a UHF frequency band, and a distribution system with a switching matrix and an input to receive the external signal, wherein each of the processing units is linked to the distribution subsystem via a wire link, and wherein the distribution system includes an advanced input/output port, wherein an output of the advanced input/output port transmits the external signal to at least a first processing unit, selected from the plurality of processing units, and wherein an input of the advanced input/output port is adapted to receive an internal signal transmitted from the first processing unit with a frequency lying in the SIB and to provide a selectable path for the internal signal through the switching matrix of the distribution subsystem to at least a second processing unit, selected from the plurality of processing units, thereby providing the selectable path between the first processing unit and the second processing unit for distribution of the internal signal.

20. The processing unit according to claim 19, further comprising:
    a signal modulation unit adapted for modulating a signal in the SIB, and for transmitting the signal which has been modulated to the distribution system via the wire link.

21. The processing unit according to claim 19, further comprising:
    a signal modulation unit adapted for modulating a signal in a frequency band which is distinct from and substantially adjacent to the SIB and for transmitting the signal which has been modulated to the distribution system via the wire link.

22. The processing unit according to claim 19, wherein the processing unit is incorporated into a set top box.

* * * * *